United States Patent
Simaria et al.

(10) Patent No.: US 10,382,272 B1
(45) Date of Patent: Aug. 13, 2019

(54) TRANSLATING CONFIGURATION INFORMATION FOR NETWORK DEVICES

(71) Applicant: Juniper Networks, Inc., Sunnyvale, CA (US)

(72) Inventors: Nilesh Kantilal Simaria, Fremont, CA (US); Balasankar Rajaguru, Theni (IN)

(73) Assignee: Juniper Networks, Inc., Sunnyvale, CA (US)

( * ) Notice: Subject to any disclaimer, the term of this patent is extended or adjusted under 35 U.S.C. 154(b) by 206 days.

(21) Appl. No.: 15/282,808

(22) Filed: Sep. 30, 2016

(51) Int. Cl.
*H04L 29/06* (2006.01)
*H04L 12/24* (2006.01)

(52) U.S. Cl.
CPC ...... *H04L 41/0866* (2013.01); *H04L 41/0813* (2013.01)

(58) Field of Classification Search
CPC ............. H04L 41/0866; H04L 41/0813; H04L 29/08072; H04L 29/08981
USPC ........................................................ 709/220
See application file for complete search history.

(56) References Cited

U.S. PATENT DOCUMENTS

| | | | | |
|---|---|---|---|---|
| 6,430,611 B1* | 8/2002 | Kita | ........................ | H04L 29/06 709/223 |
| 6,978,301 B2* | 12/2005 | Tindal | ................. | H04L 41/0226 707/999.01 |
| 7,565,416 B1* | 7/2009 | Shafer | ................. | H04L 41/0813 709/203 |
| 8,248,958 B1* | 8/2012 | Tulasi | ..................... | H04L 43/50 370/241 |
| 8,402,410 B2* | 3/2013 | Im | ....................... | G06F 12/0646 713/100 |
| 8,788,959 B1* | 7/2014 | Ogami | ................... | G06F 1/3203 715/771 |
| 2002/0120723 A1* | 8/2002 | Forth | ..................... | G01D 4/004 709/221 |
| 2004/0249904 A1* | 12/2004 | Moore | .................... | H04L 29/06 709/216 |
| 2005/0044200 A1* | 2/2005 | Aritomi | ............... | G06F 3/1204 709/223 |

(Continued)

OTHER PUBLICATIONS

Enns, "NETCONF Configuration Protocol," RFC 4741, Network Working Group, Dec. 2006, 95 pp.

(Continued)

*Primary Examiner* — Razu A Miah
(74) *Attorney, Agent, or Firm* — Shumaker & Sieffert, P.A.

(57) ABSTRACT

An example network device includes a memory configured to store existing configuration information formatted according to a high level structured input format for the network device, and a processor comprising digital logic circuitry and configured to receive data defining new configuration information formatted according to the high level structured input format, determine one or more differences between the new configuration information and the existing configuration information, translate the one or more differences into one or more sets of data defining device level configuration changes for the network device without translating the entire new configuration information, and configure the network device to update existing device level configuration for the network device according to the sets of data defining the device level configuration changes.

12 Claims, 5 Drawing Sheets

(56) References Cited

U.S. PATENT DOCUMENTS

| | | | | |
|---|---|---|---|---|
| 2005/0222969 A1* | 10/2005 | Yip | | H04L 41/0813 |
| 2006/0185001 A1* | 8/2006 | Stieglitz | | H04L 41/0806 |
| | | | | 726/4 |
| 2007/0043875 A1* | 2/2007 | Brannon, Jr. | | H04N 21/23608 |
| | | | | 709/231 |
| 2008/0115008 A1* | 5/2008 | Daftardar | | G06F 11/2089 |
| | | | | 714/3 |
| 2008/0154957 A1* | 6/2008 | Taylor | | G06F 9/4411 |
| 2008/0209015 A1* | 8/2008 | Le | | H04L 41/0866 |
| | | | | 709/220 |
| 2009/0292789 A1* | 11/2009 | Nagai | | G06F 3/0607 |
| | | | | 709/213 |
| 2010/0115068 A1* | 5/2010 | Gaur | | H04L 41/0813 |
| | | | | 709/221 |
| 2010/0195537 A1* | 8/2010 | Pelletier | | H04L 41/0604 |
| | | | | 370/255 |
| 2011/0078290 A1* | 3/2011 | Calo | | G06F 9/5094 |
| | | | | 709/221 |
| 2012/0066764 A1* | 3/2012 | Kim | | H04L 63/101 |
| | | | | 726/22 |
| 2012/0072587 A1* | 3/2012 | Nishiyama | | H04L 41/0266 |
| | | | | 709/224 |
| 2014/0280268 A1* | 9/2014 | McKay | | H04L 67/34 |
| | | | | 707/758 |
| 2014/0298291 A1* | 10/2014 | Yoshimi | | G06F 8/76 |
| | | | | 717/121 |
| 2015/0319038 A1* | 11/2015 | Spencer | | H04L 41/0803 |
| | | | | 370/254 |
| 2016/0315982 A1* | 10/2016 | Wallace | | H04L 65/4076 |
| 2016/0380810 A1* | 12/2016 | Morris | | H04L 41/0889 |
| | | | | 370/254 |

OTHER PUBLICATIONS

Bjorklund, "Yang—A Data Modeling Language for the Network Configuration Protocol (NETCONF)," RFC 6020, Internet Engineering Task Force (IETF), Oct. 2010, 173 pp.

\* cited by examiner

TRANSLATING CONFIGURATION INFORMATION FOR NETWORK DEVICES

TECHNICAL FIELD

This disclosure relates to computer networks, and more particularly, to configuring devices within computer networks.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

In some network devices, the management interface allows a client to configure the present configuration of the network device using a commit-based model. In a commit-based model, a client issues one or more configuration commands, and then directs the management interface to apply the commands by issuing a "commit" command. Typically, the client may direct the management interface to disregard the commands by issuing a "rollback" command.

Some network devices are configured to receive configuration information according to a high level, structured input data model, such as YANG. YANG is specified in Bjorklund, "YANG—A Data Modeling Language for the Network Configuration Protocol (NETCONF)," Internet Engineering Task Force (IETF), RFC 6020, October 2010, available at tools.ietf.org/html/rfc6020, the entire contents of which are incorporated herein by reference. Such network devices receive configuration information input formatted according to YANG, and then translate the configuration information to device level configuration information. YANG thereby allows users, such as network administrators, to configure a variety of network devices, having various data formats for device level configuration information, using a common, structured input.

SUMMARY

In general, this disclosure describes techniques for translating configuration information for network devices. As one example, these techniques may be used to improve the manner in which received input configuration information specified in accordance with a first data model or schema is translated into device level information specified in accordance with a second data model or schema, which may be a proprietary, manufacturer-specific configuration schema for the device being configured. Conventionally, when new configuration information is received in a high level structured input format, such as YANG, the entire set of configuration information must be translated into device level configuration information for installation and configuration of the device. In accordance with the techniques of this disclosure, however, when a management unit or other input interface receives high level configuration conforming to a structured input, such as YANG, the management unit determines differences between the newly received high level configuration information and existing high level configuration information. The management unit then translates these differences, to determine device level configuration information representative of the differences, which can be applied to the existing device level configuration information. In this manner, retranslation of existing configuration information that is unchanged by the newly received high level configuration information can be avoided, which may reduce processing demands placed on the management unit when translating the configuration information.

In one example, a method of configuring a network device includes receiving, by a processor of a network device, data defining new configuration information formatted according to a high level structured input format, the processor comprising digital logic circuitry, determining, by the processor, one or more differences between the new configuration information and existing configuration information, the existing configuration information formatted according to the high level structured input format, translating, by the processor, the one or more differences into one or more sets of data defining device level configuration changes for the network device without translating the entire new configuration information, and configuring, by the processor, the network device to update existing device level configuration for the network device according to the sets of data defining the device level configuration changes.

In another example, a network device includes a memory configured to store existing configuration information formatted according to a high level structured input format for the network device, and a processor comprising digital logic circuitry and configured to receive data defining new configuration information formatted according to the high level structured input format, determine one or more differences between the new configuration information and the existing configuration information, translate the one or more differences into one or more sets of data defining device level configuration changes for the network device without translating the entire new configuration information, and configure the network device to update existing device level configuration for the network device according to the sets of data defining the device level configuration changes.

In another example, a computer-readable medium has stored thereon instructions that, when executed, cause a processor of a network device to receive data defining new configuration information formatted according to a high level structured input format, determine one or more differences between the new configuration information and existing configuration information, the existing configuration information formatted according to the high level structured input format, translate the one or more differences into one or more sets of data defining device level configuration changes for the network device without translating the entire new configuration information, and configure the network device to update existing device level configuration for the network device according to the sets of data defining the device level configuration changes.

The details of one or more examples are set forth in the accompanying drawings and the description below. Other features, objects, and advantages of the techniques of this disclosure will be apparent from the description and drawings, and from the claims.

DETAILED DESCRIPTION

Figure 1:
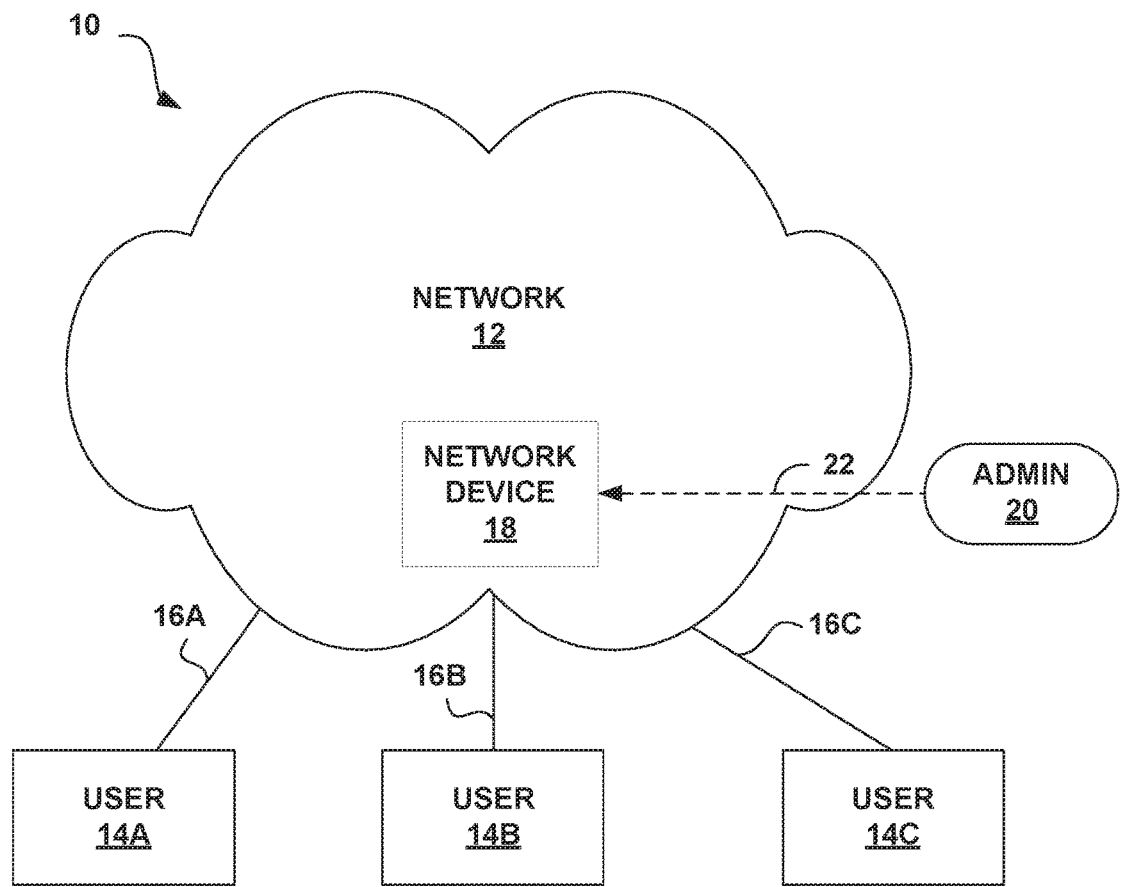
FIG. 1 is a block diagram illustrating an example computer network having a network device that supports a private configuration mode.

FIG. 1 is a block diagram illustrating an example computer network 10 in which network device 18 supports reception of configuration information in a high level structured format, such as YANG. Network device 18 is configured, according to the techniques of this disclosure, to determine differences between received, new configuration information and existing configuration information, then to translate the differences to obtain new device level configuration information to update existing device level configuration information of network device 18. Computer network 10 includes a network 12 that may be accessed by users 14A to 14C (collectively, "users 14") via one of links 16A to 16C (collectively, "links 16"). Each of users 14 represents an entity, such as an individual or an organization, that accesses network 12 to communicate with other users connected to network 12. Links 16 may be Ethernet or other network connections.

Network device 18 represents any device operating within computing network 10, such as a network hub, network switch, network router, or the like. Network device 18 may include an interface that allows administrator (admin) 20 to configure network device 18 by specifying protocols to follow, physical arrangements of hardware, or the like. For example, network device 18 may be a network router, and administrator 20 may specify configuration information to configure interface cards of the router, adjust parameters for the supported network protocols, specify the physical components within the routing device, modify the routing information maintained by the router, access software modules and other resources residing on the router, and the like.

Network device 18 supports reception of configuration information in a high level, structured format, e.g., according to YANG. In accordance with the techniques of this disclosure, network device 18 stores an existing set of configuration information in the high level, structured format as well. Accordingly, in response to receiving a new set of configuration information in the high level, structured format, network device 18 compares the new set of configuration information to the existing set of configuration information to determine differences. The differences may represent any or all of additions to the existing set of configuration information, deletions from the existing set of configuration information, and/or modified values for existing elements of the existing set of configuration information.

Network device 18 then translates the differences to a low level (that is, device level) format, which may be a proprietary, manufacturer-specific configuration schema for the device being configured. The low level format may be, for example, a specialized data model or schema specified in Extensible Markup Language Schema Definitions (XSD), a JUNOS™ OS schema from Juniper Networks, or other device-specific formats based on the device to which the high level configuration data is to be applied. In one example, network device 18 separately translates a first set of data representing additions and modifications, and a second set of data representing deletions. In particular, network device 18 may apply conventional translation functions that would otherwise be applied to the full set of newly received configuration information in the high level, structured format, to the differences. In this manner, network device 18 may add elements to the device level configuration information identified in the translated differences representing additions, modify values of existing elements of the device level configuration information as identified in the translated differences representing modifications, and delete elements from the device level information identified in the translated differences representing deletions.

After determining the differences between the existing high level configuration information and the new high level configuration information, network device 18 overwrites the existing high level configuration information (in the structured format) with the new high level configuration information. In this manner, network device 18 may receive another new set of high level configuration information, and then again perform the techniques of this disclosure to translate only the differences between the newly received set of high level configuration information and the previously most recently received high level configuration information (which overwrote the penultimate previously received high level configuration information).

Figure 2:
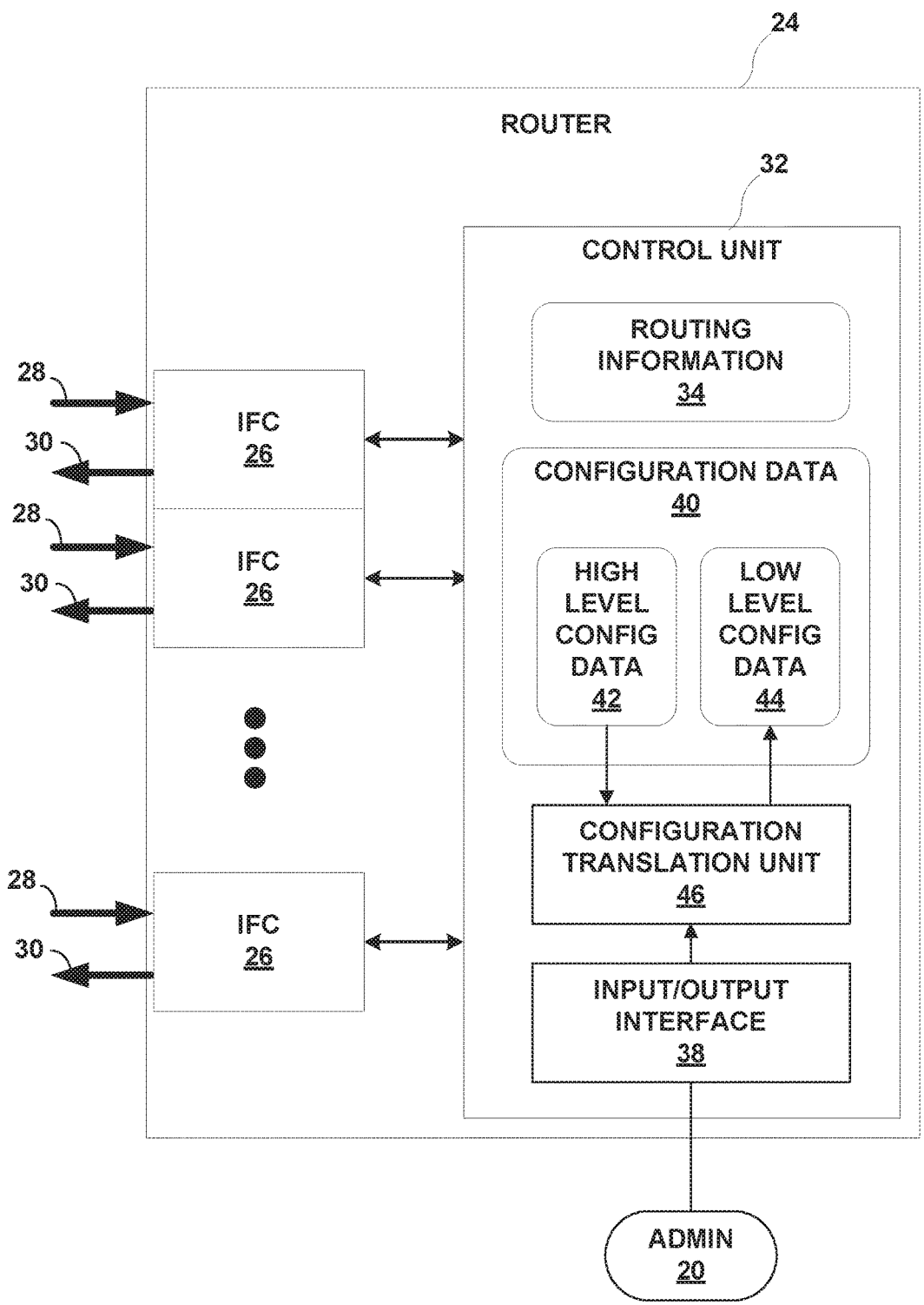
FIG. 2 is a block diagram illustrating an example network router that translates high level configuration data to low level configuration data, and operates according to the low level configuration data.

FIG. 2 is a block diagram illustrating an example network router 24 that translates high level configuration data to low level configuration data, and operates according to the low level configuration data. As such, network router 24 may be one example of network device 18 of FIG. 1. In this example, router 24 includes a set of one or more interface cards (IFCs) 26 that receive and send packets via network links 28 and 30, respectively. IFCs 26 are typically coupled to network links 28, 30 via one or more interface ports.

Router 24 further comprises a control unit 32 that maintains routing information 34. In general, control unit 32, and the components thereof, operate in the "control plane" of router 24. As discussed in greater detail below, the control plane of a router generally includes processing units for configuring lower level components, such as those operating in the "forwarding plane," such as IFCs 26. Although not shown in FIG. 2, the forwarding plane generally includes forwarding information, such as a "forwarding information base" or "FIB."

Routing information 34 describes the topology of network 12 and, in particular, routes through network 12. Routing information 34 may include, for example, route data that describes various routes within network 12, and corresponding next hop data indicating appropriate neighboring devices within network 12 for each of the routes. Routing information 34 is periodically updated to accurately reflect the topology of network 12. Routing information 34 may also be referred to as a "routing information base" or "RIB." In general, control unit 32 programs the forwarding plane (e.g., the FIB) based on routes of routing information 34, such that when router 24 receives a packet via inbound network link 28, a forwarding engine (not shown in FIG. 2) determines the destination address of the packet using the FIB and outputs the packet on an outbound network link 30 based on the destination.

Control unit 32 may receive configuration input from administrator 20 via an input/output (I/O) interface 38. I/O interface 38 generally allows administrator 20 to submit an electronic document (e.g., a file) including high level configuration information to router 24. In addition, control unit 32 includes configuration data 40, including both existing high level configuration data 42 and existing low level configuration data 44.

Control unit 32 further includes configuration translation unit 46. In some examples, configuration translation unit 46 may correspond to a management daemon (MGD) of control unit 32. In accordance with the techniques of this disclosure, in response to receiving a new set of high level configuration data, configuration translation unit 46 compares the new set of high level configuration data to existing high level configuration data 42, stored in configuration data 40 of control unit 32. Configuration translation unit 46 may determine one or more differences between the new set of high level configuration data and existing high level configuration data 42, such as one or more additions, modifications, and/or deletions. That is, the new high level configuration data may include an element that is not included in existing high level configuration data 42 (i.e., an added element), modify a value for an existing element of existing high level configuration data 42 (i.e., an updated element), or not include an element that is included in existing high level configuration data 42 (i.e., a deleted element).

Configuration translation unit 46 translates the determined differences to determine elements of low level configuration data 44 to be added, updated, or removed. In particular, if the one or more differences include an added element, configuration translation unit 46 may translate the added element to the low level representation, then add the translated low level representation of the added element to low level configuration data 44. If the one or more differences include an updated element, configuration translation unit 46 may translate the updated element to the low level representation, identify the corresponding element in low level configuration data 44, and update a value for the corresponding element in low level configuration data 44. If the one or more differences include a deleted element, configuration translation unit 46 may translate the deleted element, identify the corresponding element in low level configuration data 44, and then delete the corresponding element from low level configuration data 44.

In particular, configuration translation unit 46 may be configured with one or more translation functions configured to translate high level configuration information (e.g., data expressed in YANG) to low level configuration information (e.g., data expressed in extensible markup language (XML) according to a vendor-specific XSD or data expressed according to a JUNOS schema). The translation functions may be implemented as a Stylesheet Language Alternative Syntax (SLAX) script and/or a Python script, in some examples. Configuration translation unit 46 may be configured to receive a "commit" command after receiving new high level configuration data. Thus, configuration translation unit 46 may be configured to perform the translation techniques of this disclosure in response to receiving the "commit" command, e.g., during a commit operation. The translation function may contain a mapping for a high level configuration model (e.g., a YANG model) to a corresponding low level configuration model (e.g., a JUNOS model).

In some examples, configuration translation unit 46 forms two sets of differences between the new high level configuration data and high level configuration data 42: a first set of differences including additions and updates, and a second set of differences including deletions. Configuration translation unit 46 may translate the first set of differences to produce a set of additions or updates to be applied to low level configuration data 44, and then translate the second set of differences to produce a set of deletions to be applied to low level configuration data 44. Configuration translation unit 46 may then apply the additions and updates to low level configuration data 44, then apply the deletions to low level configuration data 44. That is, configuration translation unit 46 may add elements to or update existing elements of low level configuration data 44 as discussed above based on the translated first set of differences, then delete elements from low level configuration data 44 as discussed above based on the translated second set of differences. Furthermore, configuration translation unit 46 may replace high level configuration data 42 with the new set of high level configuration data, such that later updates can be compared and applied as discussed above.

Configuration translation unit 46 is shown as a single entity in the example of FIG. 2, but in other examples, control unit 32 may include a separate unit, or sub-unit, such as a delta extraction unit. In general, configuration translation unit 46, or the delta extraction unit, extracts one or more differences (that is, the delta(s)) between high level configuration data 42 and newly received high level configuration data. Configuration translation unit 46 may extract these differences in response to a "commit" command, issued to commit the new high level configuration data to operation for router 24.

Control unit 32 may be configured to accept a "show|compare" command as well. In response to receiving the "show|compare" command, control unit 32 may output a representation of existing and/or newly received high level configuration data, which may also include representations of differences between the existing and newly received high level configuration data. In response to a commit command, configuration translation unit 46 may present a similar representation of the newly received high level configuration data, which may include representations of differences between the newly received high level configuration data and the existing high level configuration data. However, there may be certain differences, such as emitting additions and deletions in the differences separately, along with a complete context in a proper XML format, emitting complete hierarchy information in both the additions and deletions, treating deactivated configuration as deleted configuration data, and ignoring any newly added configuration data that is to be deactivated.

As an example, suppose high level configuration data 42 includes an interface defined as "ge-1/1/1" that is to be deleted as indicated by newly received high level configuration data, and that the newly received high level configuration data defines a new interface as "ge-2/2/2." A non-XML, single patch for these changes may be represented as follows:

```
user@host# show compare
[edit interfaces]
ge-1/1/1 {
unit 0 {
family inet;
- }
- }
+ ge-2/2/2 {
+ unit 0 {
+ family inet;
+ }
+ }
```

In response to this set of changes, a first XML patch for deletion may be:
ge-1/1/1 while a second XML patch for addition may be:
ge-2/2/2
0.

A configuration loader unit (not shown in FIG. 2) of configuration translation unit 46, or configuration translation unit 46 itself, may be invoked twice: once for additions and modifications, and once for deletions, to update low level configuration data 44. That is, using the set of changes/XML patches, configuration translation unit 46 may delete "ge-1/1/1" from low level configuration data 44, then add "ge-2/2/2" to low level configuration data 44.

In this manner, the techniques of this disclosure (including translating differences between newly received high level configuration data and existing high level configuration data) may achieve certain advantages over, e.g., translating the newly received high level configuration data in its entirety. For example, there is no need to inspect the complete set of newly received high level configuration data for purposes of translation. The difference data may include both addition data and deletion data. Furthermore, the generated configuration for the deletion differences can be deleted from low level configuration data 44, which avoids the need to completely replace low level configuration data 44 for each "commit" command received.

Figure 3:
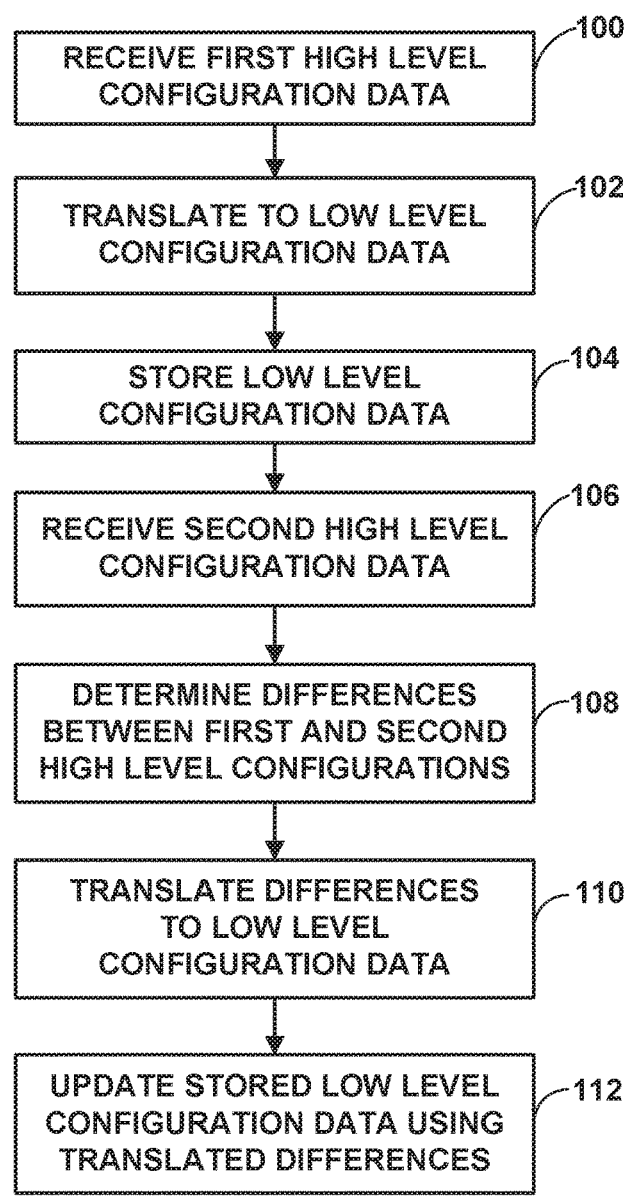
FIG. 3 is a flowchart illustrating an example method of configuring and reconfiguring the router of FIG. 2 in accordance with techniques of this disclosure.

FIG. 3 is a flowchart illustrating an example method of configuring and reconfiguring router 24 in accordance with techniques of this disclosure. The method of FIG. 3 is explained with respect to router 24 of FIG. 2. However, it should be understood that other devices may be configured to perform this or a similar method.

In this example, initially, router 24 receives a first high-level configuration (100), e.g., from administrator 20. In particular, administrator 20 may enter or submit data representing the first high-level configuration for router 24. Administrator 20 may provide the first high-level configuration via input/output interface 38. Input/output interface 38 receives the data representing the first high level configuration and provides the data representing the first high level configuration data to configuration translation unit 46. Configuration translation unit 46 initially stores this data as high level configuration data 42 in configuration data 40 of control unit 32.

Configuration translation unit 46 includes one or more translation functions that are specifically designed for router 24, e.g., for services provided by router 24. Accordingly, configuration translation unit 46 applies the translation functions to the high-level configuration to generate low level configuration data for router 24 (102). Configuration translation unit 46 then stores the low level configuration to low level configuration data 44 of configuration data 40 (104). Moreover, configuration translation unit 46 stores the first high level configuration data as high level configuration data 42.

Subsequently, router 24 receives a second set of high level configuration data (106), which is different than the first high level configuration data. Configuration translation unit 46 then determines differences between the first high level configuration data (stored as high level configuration data 42 in configuration data 40) and the second, newly received set of high level configuration data (108). In particular, configuration translation unit 46 retrieves the first high level configuration data 42 from configuration data 40 and compares the first and second high level configurations to determine whether the elements of the second high-level configuration represent additions, modifications, or deletions relative to the first high-level configuration. In some examples, configuration translation unit 46 generates a single set of data describing these differences, whereas in other examples, configuration translation unit 46 may generate separate sets of data describing additions, modifications, and/or removals (that is, deletions).

In any case, configuration translation unit 46 then applies the translation functions to the data describing the differences, thereby translating the differences to low level configuration data for router 24 (110). Configuration translation unit 46 then stores the newly received high level configuration data as high level configuration data 42 in configuration data 40, and updates low level configuration data 44 according to the translated differences (112). For example, if the translated differences indicate an addition, configuration translation unit 46 adds a corresponding element to low level configuration data 44. If the translated differences indicate a modification/update, configuration translation unit 46 updates a value for a corresponding element of low level configuration data 44. If the translated differences indicate a deletion, configuration translation unit 46 deletes the corresponding element from low level configuration data 44.

Configuration translation unit 46 may issue commands to update low level configuration data 44 of configuration data 40. Such commands may comprise, for example, command-line interface (CLI) commands that would otherwise be manually entered by a user (such as administrator 20) to configure router 24 via input/output interface 38.

The techniques described in this disclosure may be implemented in hardware, software, firmware or any combination thereof. For example, various aspects of the techniques may be implemented within one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

Figure 4:
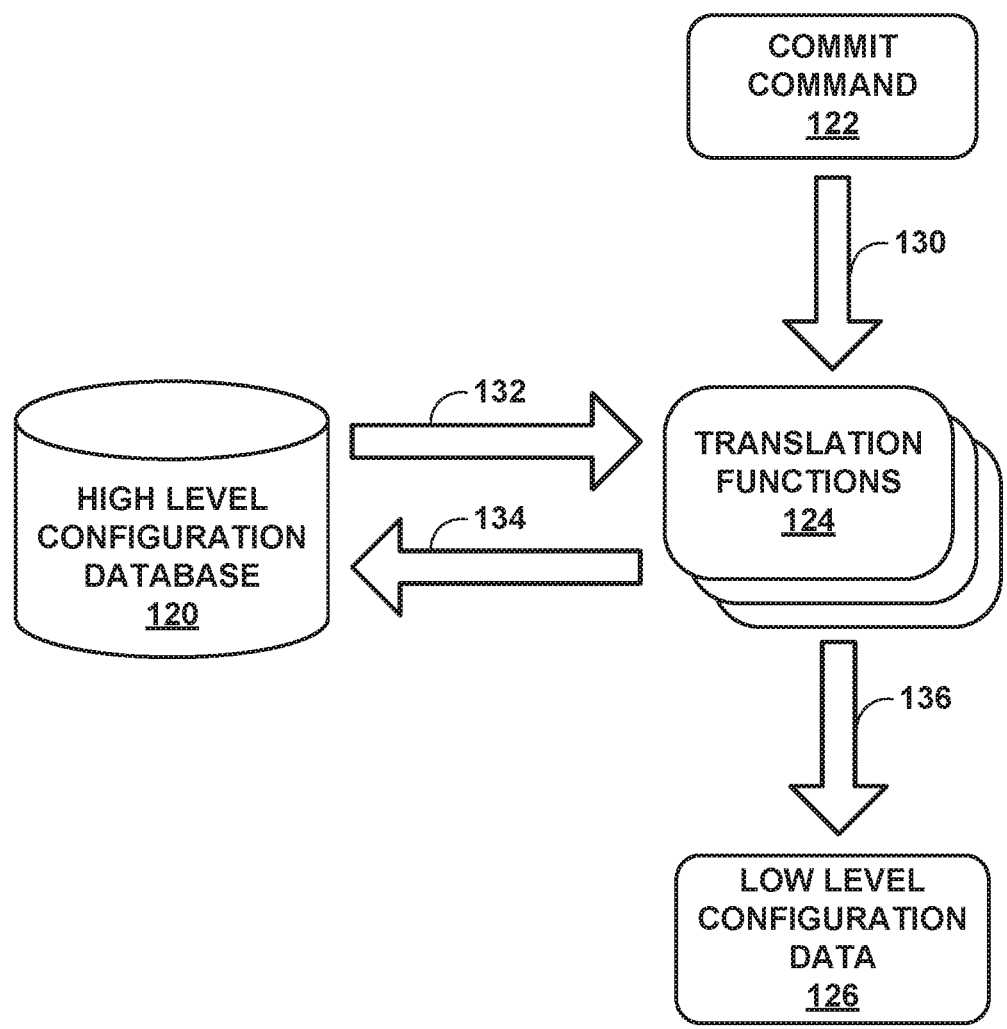
FIG. 4 is a flow diagram illustrating an example technique by which high level configuration data can be translated to low level configuration data in response to a commit command in accordance with the techniques of this disclosure.

FIG. 4 is a flow diagram illustrating an example technique by which high level configuration data can be translated to low level configuration data, e.g., in response to a commit command, in accordance with the techniques of this disclosure. The example of FIG. 4 illustrates commit command 122, translation functions 124, high level configuration database 120, and low level configuration data 126. Translation functions 124 may correspond to functions executed by configuration translation unit 46 of FIG. 2. High level configuration database 120 may correspond to high level configuration data 42 of FIG. 2. Low level configuration data 126 may correspond to low level configuration data 44 of FIG. 2.

Initially, it is presumed that a network device, such as router 24, includes existing high level configuration data, stored in high level configuration database 120. After receiving new high level configuration data, the network device further receives commit command 122, indicating that the new high level configuration data is to be "committed," i.e., used to configure the network device, such that the network device operates according to the new high level configuration data. Thus, the commit command 122 causes the network device to invoke translation functions 124 (130). Although described with respect to network devices that utilize a commit/rollback configuration model, the techniques described herein are not limited in this regard and may be applied to other network devices.

In particular, in accordance with the techniques of this disclosure, the network device retrieves the existing high level configuration data of high level configuration database 120 (132), and calculates one or more differences between the existing high level configuration data and the new high level configuration data. The network device then executes translation functions 124 on the calculated differences to produce translated data representative of the differences, which the network device uses to update existing low level configuration data 126 (136). Furthermore, the network device stores the new high level configuration data to high level configuration database 120 (134), in the event that another set of new high level configuration data is received and committed.

Figure 5:
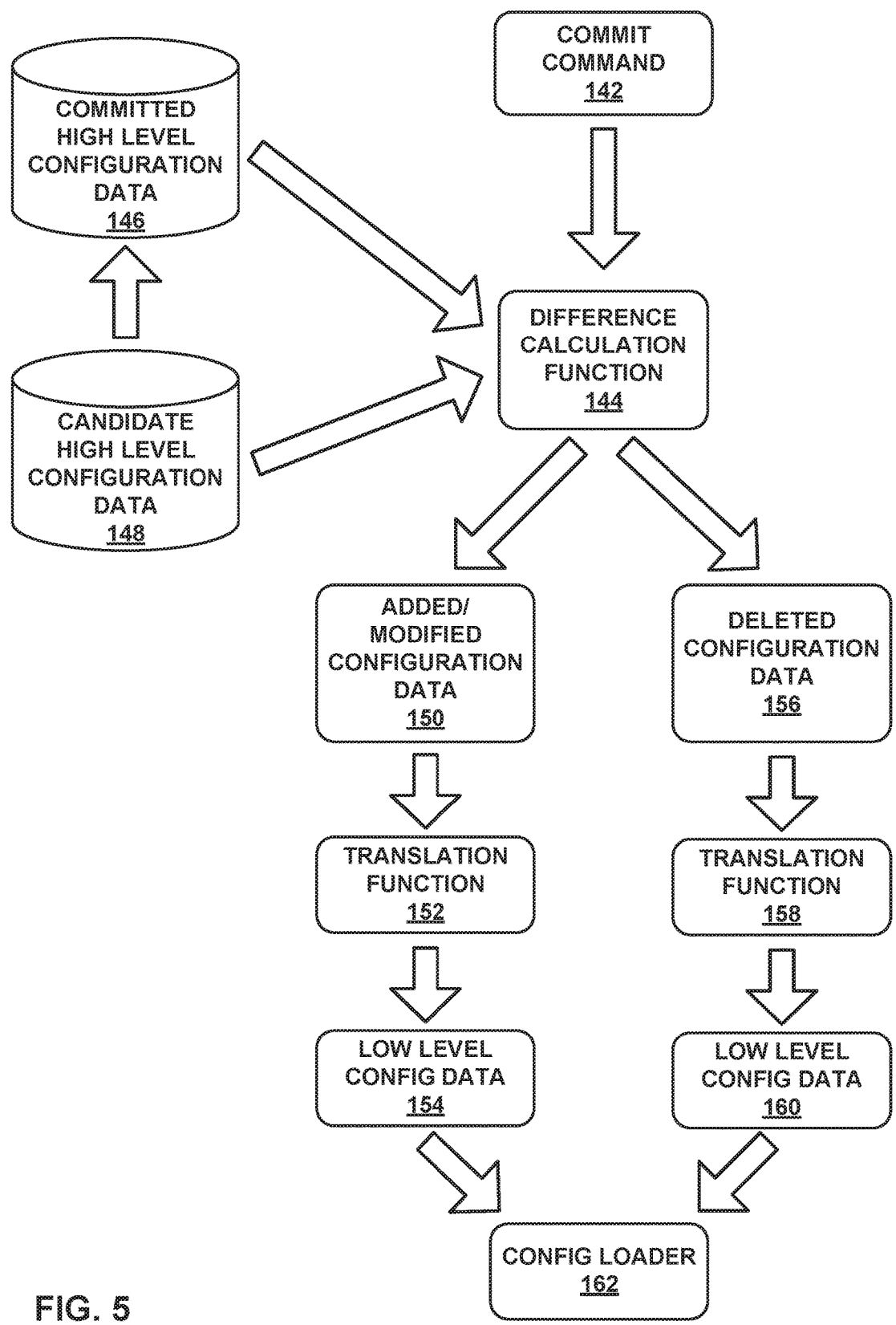
FIG. 5 is a flow diagram illustrating another example technique by which high level configuration data can be translated to low level configuration data in response to a commit command in accordance with the techniques of this disclosure.

FIG. 5 is a flow diagram illustrating another example technique by which high level configuration data can be translated to low level configuration data in response to a commit command in accordance with the techniques of this disclosure. The example of FIG. 5 illustrates commit command 142, difference calculation function 144, committed high level configuration data 146, candidate high level configuration data 148, translation functions 152 and 158, and configuration ("config") loader 162. Translation functions 152 and 158, and difference calculation function 144, may correspond to functions executed by configuration translation unit 46 of FIG. 2. Committed high level configuration database 144 may correspond to high level configuration data 42 of FIG. 2. Candidate high level configuration data 148 may correspond to input received by configuration translation unit 46 of FIG. 2. Configuration loader 162 may correspond to a portion of configuration translation unit 46 of FIG. 2, or function executed by configuration translation unit 46 of FIG. 2, that updates existing low level configuration data, e.g., low level configuration data 44 of FIG. 2.

In response to receiving commit command 142, difference calculation function 144 retrieves committed high level configuration data 146 and candidate high level configuration data 148. In this manner, configuration translation unit 46 may invoke a cscript utility to execute translation functions 152, 158 on differences between existing and new high level configuration data, in response to commit command 142. Execution of difference calculation function 144, e.g., by configuration translation unit 46, yields one or more differences between committed high level configuration data 146 and candidate high level configuration data 148. In particular, while executing difference calculation function 144, configuration translation unit 46 may compare elements of committed high level configuration data 146 to elements of candidate high level configuration data 148 in parallel to identify the differences between these two sets of data.

In this manner, execution of difference calculation function 144 (which may also be described as a delta extractor) may result in extraction of one or more differences, which may include emitting addition differences (or deltas) and deletion differences (or deltas) in separate files, such as added/modified configuration data 150 and deleted configuration data 156. In particular, in this example, the one or more differences include a first set of differences including additions or modifications, which are described in added/modified configuration data 150, and a second set of differences including deletions, which are described in deleted configuration data 156.

That is, added/modified configuration data 150 represents elements of candidate high level configuration data 148 that are newly added or modified, relative to committed high level configuration data 146. In particular, added elements represent elements that are present in candidate high level configuration data 148 but not present in committed high level configuration data 146, while modified elements represent elements that are present in both candidate high level configuration data 148 and committed high level configuration data 146, but with different values.

Deleted configuration data 156 represents elements of committed high level configuration data 146 that are to be deleted by candidate high level configuration data 148. In particular, deleted configuration data 156 represents elements that are present in committed high level configuration data 146, but not present in candidate high level configuration data 148.

Translation functions 152, 158 may be the same function or different functions. In general, translation functions 152, 158 are configured to convert data expressed in a high level structured input format, such as YANG, to a low level (i.e., device level) format, such as JUNOS script. Translation functions 152, 158 may be implemented in, e.g., Python, SLAX, or other scripting languages. In general, translation functions 152, 158 are executed (e.g., by configuration translation unit 46 of FIG. 2), using added/modified configuration data 150 or deleted configuration data 156 as input, respectively, to convert accepting added/modified configuration data 150 to low level configuration data 154 and to convert deleted configuration data 156 to low level configuration data 160. Thus, the cscript utility discussed above may invoke execution of translation functions 152, 158 independently for different sets of difference data (i.e., different sets of deltas). Execution of translation functions 152, 158 yields two distinct sets of low level configuration data modifications in this example, namely, low level configuration data 154 and low level configuration data 160.

Low level configuration data 154 includes data representing elements to be added to, or modified within, existing low level configuration data (e.g., low level configuration data 44 of FIG. 2). That is, if an element is present in low level configuration data 154 but not present in low level configuration data 44, configuration loader 162 adds the element to low level configuration data 44. If an element is present in both low level configuration data 154 and in low level configuration data 44, configuration loader 162 updates the value of the element in low level configuration data 44 to have the value of the corresponding element in low level configuration data 154.

Low level configuration data 160 includes data representing elements to be deleted from existing low level configuration data (e.g., low level configuration data 44 of FIG. 2). That is, for each element present in low level configuration data 160, configuration loader 162 deletes the element from low level configuration data 44.

When implemented in software, the functionality ascribed to the systems and devices described in this disclosure may be embodied as instructions on a computer-readable medium such as random access memory (RAM), read-only memory (ROM), non-volatile random access memory (NVRAM), electrically erasable programmable read-only memory (EEPROM), FLASH memory, magnetic media, optical media, or the like. The instructions are executed to support one or more aspects of the functionality described in this disclosure The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method of configuring a network device, the method comprising:
   receiving, by a processor of a network device, data defining new configuration information formatted according to a high level structured input format, the processor comprising digital logic circuitry;
   determining, by the processor, one or more differences between the new configuration information and existing configuration information, the existing configuration information formatted according to the high level structured input format, wherein determining the one or more differences comprises:
     determining a first set of differences representing additions or updates to existing elements in the new configuration information relative to the existing configuration information; and
     determining a second set of differences representing deletions from the existing configuration information in the new configuration information;
   translating, by the processor, the one or more differences into one or more sets of data defining device level configuration changes for the network device without translating the entire new configuration information, wherein translating comprises:
     translating the first set of differences to form a first set of device level configuration additions or updates; and
     translating the second set of differences to form a second set of device level configuration deletions; and
   configuring, by the processor, the network device to update existing device level configuration for the network device according to the sets of data defining the device level configuration changes, wherein configuring comprises:
     adding elements to or updating elements of the existing device level configuration as indicated by the first set of device level configuration additions or updates; and
     deleting elements from the existing device level configuration as indicated by the second set of device level configuration deletions.

2. The method of claim 1, wherein the high level structured input format comprises YANG.

3. The method of claim 1, wherein the device level configuration is formatted according to Extensible Markup Language (XML).

4. The method of claim 1, further comprising, after translating the one or more differences, overwriting the existing configuration information formatted according to the high level structured input format with the new configuration information formatted according to the high level structured input format.

5. A network device comprising:
   a memory configured to store existing configuration information formatted according to a high level structured input format for the network device; and
   a processor comprising digital logic circuitry, the processor configured to:
     receive data defining new configuration information formatted according to the high level structured input format;
     determine one or more differences between the new configuration information and the existing configuration information, wherein to determine the one or more differences, the processor is configured to:
       determine a first set of differences representing additions or updates to existing elements in the new configuration information relative to the existing configuration information; and
       determine a second set of differences representing deletions from the existing configuration information in the new configuration information;
     translate the one or more differences into one or more sets of data defining device level configuration changes for the network device without translating the entire new configuration information, wherein to translate the one or more differences, the processor is configured to:

translate the first set of differences to form a first set of device level configuration additions or updates; and translate the second set of differences to form a second set of device level configuration deletions; and configure the network device to update existing device level configuration for the network device according to the sets of data defining the device level configuration changes, wherein to configure the network device to update the existing device level configuration, the processor is configured to:

add elements to or update elements of the existing device level configuration as indicated by the first set of device level configuration additions or updates; and delete elements from the existing device level configuration as indicated by the second set of device level configuration deletions.

6. The network device of claim 5, wherein the high level structured input format comprises YANG.

7. The network device of claim 5, wherein the device level configuration is formatted according to Extensible Markup Language (XML).

8. The network device of claim 5, wherein the processor is further configured to, after translating the one or more differences, overwrite the existing configuration information in the memory formatted according to the high level structured input format with the new configuration information formatted according to the high level structured input format.

9. A non-transitory computer-readable storage medium comprising instructions that, when executed, cause a processor of a network device to:

receive data defining new configuration information formatted according to a high level structured input format;

determine one or more differences between the new configuration information and existing configuration information, the existing configuration information formatted according to the high level structured input format, wherein to determine the one or more differences, the instructions cause the processor to:

determine a first set of differences representing additions or updates to existing elements in the new configuration information relative to the existing configuration information; and determine a second set of differences representing deletions from the existing configuration information in the new configuration information;

translate the one or more differences into one or more sets of data defining device level configuration changes for the network device without translating the entire new configuration information, wherein the instructions that cause the processor to translate the one or more differences comprise instructions that cause the processor to:

translate the first set of differences to form a first set of device level configuration additions or updates; and translate the second set of differences to form a second set of device level configuration deletions; and configure the network device to update existing device level configuration for the network device according to the sets of data defining the device level configuration changes wherein the instructions that cause the processor to configure the network device comprise instructions that cause the processor to:

add elements to or updating elements of the existing device level configuration as indicated by the first set of device level configuration additions or updates; and delete elements from the existing device level configuration as indicated by the second set of device level configuration deletions.

10. The non-transitory computer-readable storage medium of claim 9, wherein the high level structured input format comprises YANG.

11. The non-transitory computer-readable storage medium of claim 9, wherein the device level configuration is formatted according to Extensible Markup Language (XML).

12. The non-transitory computer-readable storage medium of claim 9, further comprising instructions that cause the processor to, after translating the one or more differences, overwrite the existing configuration information formatted according to the high level structured input format with the new configuration information formatted according to the high level structured input format.

\* \* \* \* \*